United States Patent
Wun et al.

(10) Patent No.: US 7,568,549 B2
(45) Date of Patent: Aug. 4, 2009

(54) STEERING DEVICE FOR VEHICLE (75) Inventors: Chai Yu Wun, Isehara (JP); Naotaka Chino, Yokohama (JP); Noriki Kubokawa, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 279 days.

(21) Appl. No.: 11/606,384

(22) Filed: Nov. 30, 2006

(65) Prior Publication Data
US 2007/0144816 A1 Jun. 28, 2007

(30) Foreign Application Priority Data
Dec. 1, 2005 (JP) ............................. 2005-347600

(51) Int. Cl.
*B62D 5/00* (2006.01)
(52) U.S. Cl. ...................................... 180/402; 180/444
(58) Field of Classification Search ................. 180/402, 180/405, 406, 407, 443, 444; 242/579, 586, 242/586.2, 602; 74/505, 506
See application file for complete search history.

(56) References Cited

U.S. PATENT DOCUMENTS

| | | | | |
|---|---|---|---|---|
| 5,893,426 A | * | 4/1999 | Shimizu et al. | 180/400 |
| 5,996,723 A | * | 12/1999 | Shimizu et al. | 180/444 |
| 6,116,371 A | * | 9/2000 | Suyama et al. | 180/444 |
| 6,510,757 B1 | * | 1/2003 | Wessel | 74/502.2 |
| 7,007,769 B2 | * | 3/2006 | Hara et al. | 180/402 |
| 2003/0197360 A1 | | 10/2003 | Shimizu | |

FOREIGN PATENT DOCUMENTS

| | | |
|---|---|---|
| DE | 197 39 952 A1 | 3/1999 |
| EP | 1 528 031 A1 | 5/2005 |
| JP | 10-059195 | 3/1998 |

* cited by examiner

*Primary Examiner*—Tony H. Winner
(74) *Attorney, Agent, or Firm*—Drinker Biddle & Reath LLP (57) ABSTRACT

A vehicle steering device includes a cable, a pulley, and a securing portion. The cable transmits movement of an operating unit operated by a driver to a turning unit that turns a steering control wheel. The pulley winds up the cable. The securing portion secures an end of the cable to the pulley. A restricting member is provided at the pulley. The cable is wound up along a winding groove, which is formed in an outer peripheral surface of the pulley. As the pulley is rotated, the cable is brought into contact with the winding groove by the restricting member. The restricting member is disposed at a location that is separated from the securing portion along the winding groove by a predetermined length.

20 Claims, 6 Drawing Sheets

STEERING DEVICE FOR VEHICLE

CROSS-REFERENCE TO RELATED APPLICATIONS

This application claims priority under 35 U.S.C. § 119 to Japanese Patent Application No. 2005-347600, filed on Dec. 1, 2005, the disclosure of which is incorporated by reference herein in its entirety.

BACKGROUND OF THE INVENTION

1. Field of the Invention

The invention relates to a vehicle steering device that includes a cable that is used, for example, as a backup mechanism in a steer-by-wire system or in a steering system that provides a degree of freedom in routing an operative coupling between a steering wheel and a steering mechanism.

2. Description of the Related Art

A related vehicle steering device has a steering wheel and a gear reduction mechanism that are connected to each other with a cable. Its purpose is to increase durability by preventing a load from being applied to a portion where a cable end and a pulley are secured to each other. In the related vehicle steering device, when the cable is helically wound upon a pulley groove formed in a peripheral surface of a driver pulley, the cable is always wound two or more times upon the driver pulley, and a friction force is generated between the cable and the driver pulley.

However, in the related vehicle steering device, since the cable is wound a plurality of times upon the driver pulley, the overall length of the driver pulley in a rotational axis direction is increased, thereby increasing the size of the driver pulley and, thus, increasing the size of the vehicle steering device.

SUMMARY OF THE INVENTION

It is desirable to overcome the aforementioned disadvantages of the related vehicle steering device, and to achieve a vehicle steering device with a reduced size.

Accordingly, there is provided a vehicle steering device that pivots at least one steering controlled vehicle wheel in response to a steering command. The vehicle steering device includes an operating unit receiving the steering command, a turning unit pivoting the at last one steering controlled vehicle wheel, a cable, and a first restricting member. The operating unit includes one of a first cylindrical member and a second cylindrical member that rotates about a first axis of rotation. The first cylindrical member includes a first groove that is formed on a first outer peripheral surface. The turning unit includes the other the first cylindrical member and the second cylindrical member that rotates about a second axis of rotation. The second cylindrical member includes a second groove formed on a second outer peripheral surface. The cable extends between first and second ends. The first end is coupled to the first cylindrical member, and the second end is coupled to the second cylindrical member. The cable includes first and second portions. The first portion, which extends a first predetermined length from the first end, lies in the first groove and is wound on the first outer peripheral surface. The second portion, which extends a second predetermined length from the second end, lies in the second groove and is wound on the second outer peripheral surface. The first restricting member maintains contiguous engagement between the first portion of the cable and the first groove. The first restricting member is spaced along the first portion from the first end.

Further, there is provided a vehicle steering device that pivots at least one steering controlled vehicle wheel in response to a steering command. The vehicle steering device includes a cylindrical member, a cable, and a restricting member. The cylindrical member rotates about an axis of rotation in response to at least one of the steering command and pivoting of the at least one steering controlled vehicle wheel, and includes a groove formed on an outer peripheral surface. The cable includes an end that is coupled to the cylindrical member, and a portion that extends a predetermined length from the end. The portion lies in the groove and is wound on the outer peripheral surface of the cylindrical member. The restricting member maintains contiguous engagement between the portion of the cable and the groove, and is spaced along the portion from the end.

Further, there is provided a vehicle steering device that pivots at least one steering controlled vehicle wheel in response to a steering command. The vehicle steering device includes an operating means for receiving the steering command, a turning means for pivoting the at last one steering controlled vehicle wheel, cable means for transmitting torque between the operating means and the turning means, winding means for converting linear movement of the cable means to rotary movement of the operating and turning means, and restricting means for preventing rising of the cable means with respect to the winding means during not more than one rotation of the winding means.

Also, there is provided a steering method of pivoting at least one steering controlled vehicle wheel in response to a steering command. The method includes winding a first end of a cable on a first cylindrical member, winding a second end of the cable on a second cylindrical member, securing the first end to the first cylindrical member, securing the second end to the second cylindrical member, and restraining with respect to less than one rotation of the first cylindrical member a first portion of the cable. The first portion of the cable extends from the first end toward the second end, and the second portion of the cable extends from the second end toward the first end.

Further, there is provided a system of transferring torque, including a first cylindrical member, a second cylindrical member, a first cable extending between first and second ends, and a first restricting member. The first cylindrical member rotates about a first axis of rotation and has a first groove formed on a first outer peripheral surface. The second cylindrical member rotates about a second axis of rotation and has a second groove formed on a second outer peripheral surface. The first end of the first cable is coupled to the first cylindrical member and the second end of the first cable is coupled to the second cylindrical member. The first cable includes first and second portions. The first portion extends a first predetermined length from the first end, and the second portion extends a second predetermined length from the second end. The first portion lies in the first groove and is wound on the first outer peripheral surface, and the second portion lies in the second groove and is wound on the second outer peripheral surface. The first restricting member maintains contiguous engagement between the first portion of the first cable and the first groove. The first restricting member is spaced along the first portion from the first end.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

A vehicle steering device will hereunder be described with reference to the drawings.

First, a structure of the vehicle steering system will be described.

Overall Structure

Figure 1:
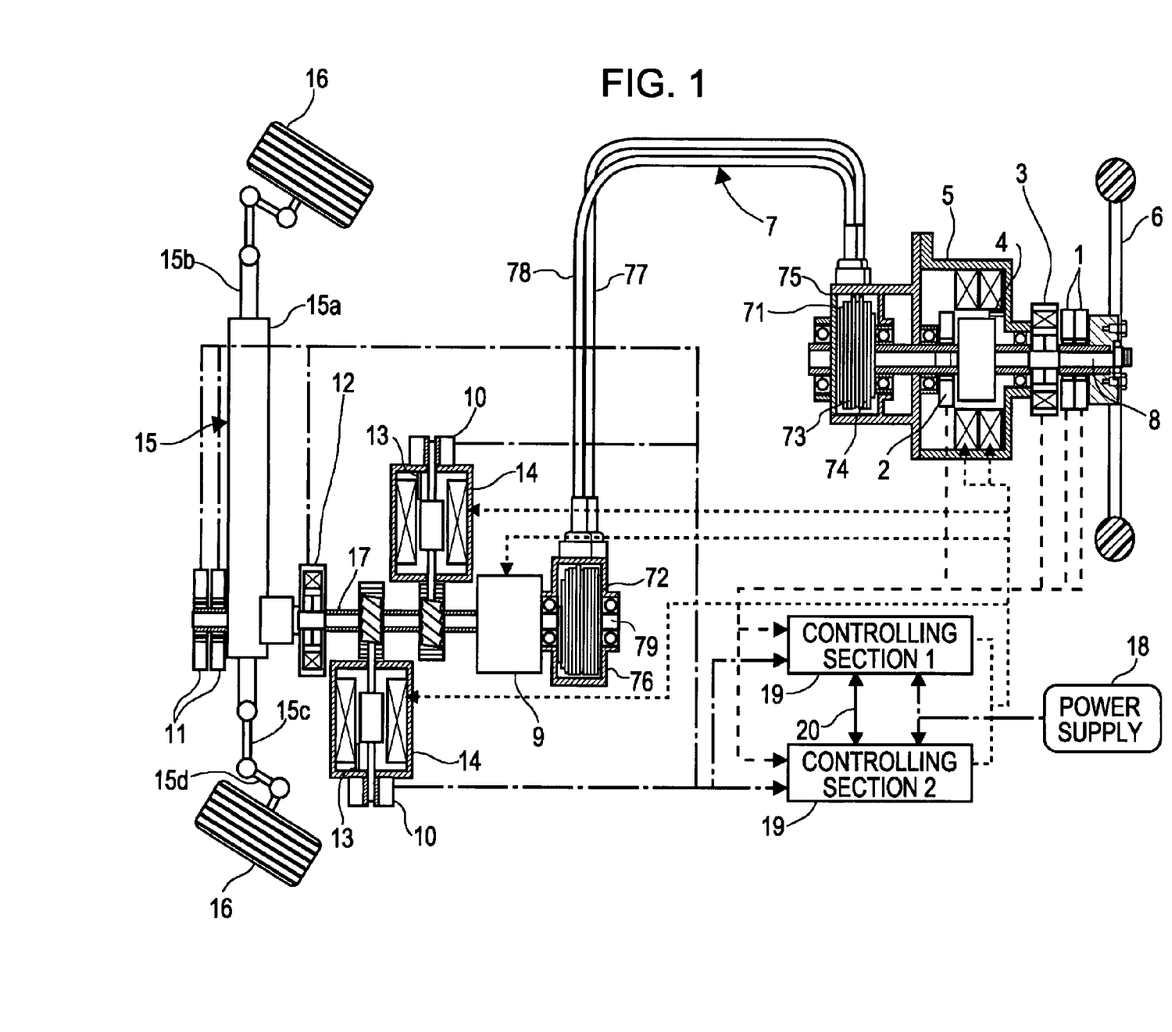
FIG. 1 is an overall structural view of a steer-by-wire system including a vehicle steering device.

FIG. 1 is an overall structural view of a steer-by-wire system (hereafter referred to as the "SBW system") in which a vehicle steering device is provided.

The SBW system to which the vehicle steering device is applied includes (1) an operating device (also called an "operating unit"), (2) a backup device (also called a "backup unit"), (3) a turning device (also called a "turning unit"), and (4) a controller. These structures will be described in detail below.

(1) Operating Device

The operating device includes a pair of steering-angle sensors 1, an encoder 2, a pair of torque sensors 3 (only one is indicated in FIG. 1), a Hall integrated circuit ("IC") 4, a reactive-force motor 5, and a steering wheel 6.

The steering-angle sensors 1 detect an operation angle of the steering wheel 6 that a driver operates, and are disposed about a column shaft 8 that connects the steering wheel 6 and a cable column 7 (described later). An operation angle detecting system of the steering wheel 6 provides a dual system that includes the two steering-angle sensors 1 for redundancy. As they are used herein, the terms "dual system," "redundancy," and "redundant" refer to the duplication of components in a system with the intention of increasing reliability of the system. The steering-angle sensors 1 are disposed between the steering wheel 6 and the torque sensors 3, and can detect the steering angle without being influenced by an angular change resulting from twisting of the torque sensors 3. The steering-angle sensors 1 may, for example, include absolute resolvers, such as a brushless transmitter resolver or any equivalent type of rotary electrical device that is used to measure degrees of rotation.

The torque sensors 3 are disposed between the reactive-force motor 5 and the steering-angle sensors 1. Two torque sensors 3 also provide a dual system. The torque sensors 3 may, for example, include an axially extending torsion bar, a first shaft that is connected to one end of the torsion bar and is coaxial with the torsion bar, a second shaft that is connected to the other end of the torsion bar and is coaxial with the torsion bar and the first shaft, a first magnetic member secured to the first shaft, a second magnetic member secured to the second shaft, a coil opposing the first and second magnetic members, and a third magnetic member that surrounds the coil and forms a magnetic circuit along with the first and second magnetic members. Inductance in each coil changes in response to relative displacement between the first and second magnetic members, which is based on twisting of the torsion bars, so as to detect torque on the basis of an output signal based on the inductance.

The reactive-force motor 5 is a steering reactive-force actuator that applies a reactive force to the steering wheel 6. As it applies herein to a SBW system, "reactive force" refers to providing to the driver, through the steering wheel, a feeling about the conditions that are being experienced by the steering controlled vehicle wheels. The reactive-force motor 5 may include, for example, an electric motor that includes a stator and a rotor for which the column shaft 8 provides a rotational axis. A casing of the reactive-force motor 5 may be secured at any suitable location on the chassis or body of a vehicle (not shown). Preferably, the reactive-force motor 5 includes a brushless motor, the encoder 2, and the Hall IC 4. It is also envisioned that the reactive-force motor 5 and the Hall IC 4, i.e., without the encoder 2, may generate the required motor torque. However, minute torque variations may occur which may result in a poor steering reactive force feel. Therefore, to more finely and smoothly control the steering reactive force, it is preferable to include the encoder 2, which is mounted on the axis of the column shaft 8, to further control the reactive-force motor 5 and reduce minute torque variations so as to improve the feel of the steering reactive force. A resolver may be used instead of the encoder 2.

(2) Backup Device

The backup device, which can mechanically couple the operating device and the turning device, may include the cable column 7 and a backup clutch 9.

The cable column 7 provides a mechanical torque transmitting mechanism that can be routed so as not to interfere with vehicle members that may be physically interposed between the operating and turning devices. As such, the cable column 7 may provide redundancy, e.g., a backup mode to a SBW system, when the backup clutch 9 is engaged.

The cable column 7 includes two cables 73 and 74 that transfer torque between two pulleys 71 and 72. The two cables 73 and 74 are wound in opposite directions on each of the two pulleys 71 and 72, and respective ends of the two cables 73 and 74 are secured to both of the pulleys 71 and 72. The two cables 73 and 74 slide within respective sheaths 77 and 78, the ends of which are connected to each of two pulley casings 75 and 76. In FIG. 1, reference numeral 79 denotes a pulley shaft that is supported for relative rotation with respect to pulley casing 76.

(3) Turning Device

The turning device includes a pair of encoders 10 (only one is indicated in FIG. 1), a pair of steering-angle sensors 11, a pair of torque sensors 12 (only one is indicated in FIG. 1), a pair of Hall ICs 13, a pair of turning motors 14, a steering mechanism 15, and a pair of steering controlled vehicle wheels 16.

The steering-angle sensors 11 and the torque sensors 12 are provided on an axis of a pinion shaft 17 that has the backup clutch 9 disposed at one end thereof and has a pinion gear disposed at its other end. Like the steering-angle sensors 1, the steering-angle sensors 11 provide a dual system. Preferably, the steering-angle sensors 11 may include, for example, absolute resolvers that detect the rotational speed of the pinion shaft 17. Like the torque sensors 3, the torque sensors 12 provide a dual system. Preferably, the torque sensors 12 detect torque on the basis of a change in inductance. The steering-angle sensors 11 and the steering torque sensors 11 may be disposed as shown on opposite sides of the pinion gear (not shown) such that the steering angle detected by the steering-angle sensors 11 is not influenced by an angle change resulting from twisting of the torque sensors 12.

When driven, the turning motors 14 apply turning torque to the pinion shaft 17. Preferably, each of the turning motors 14 is drivingly coupled to the pinion shaft 17 by respective pairs of worm and pinion gear sets (not indicated in FIG. 1). The pinion gears are disposed on the pinion shaft 17 between the backup clutch 9 and the torque sensors 12. The turning motors 14 provide a dual system and, preferably, are brushless motors. Like the reactive-force motor 5, the encoders 10 and the Hall ICs 13 are provided with each brushless motor.

The steering mechanism 15 pivots left and right steering controlled vehicle wheels 16 in response to rotation of the pinion shaft 17. Preferably, the steering mechanism 15 includes a rack shaft 15b, a pair of tie rods 15c (only one is indicated in FIG. 1), and a pair of knuckle arms 15d (only one is indicated in FIG. 1). The rack shaft 15b is inserted in a rack tube 15a and includes a rack gear that engages the pinion gear (not shown) on the pinion shaft 17. Each of the tie rods 15c couples respective ends of the rack shaft 15b to a corresponding one of the knuckle arms 15d. Each of the knuckle arms 15d couples a respective one of the tie rods 15c with a respective one of the steering controlled vehicle wheels 16.

(4) Controller

The controller is also a dual system that includes a pair of controlling sections 19 that perform, for example, processing calculations. Power is supplied to the controlling sections 19 by a power supply 18.

Detection values from the steering-angle sensors 1, the encoder 2, the torque sensors 3, and the Hall IC 4 of the operating device, and detection values from the encoders 10, the steering-angle sensors 11, the torque sensors 12, and the Hall IC 13 of the turning device are input to controlling sections 19.

Each controlling section 19 includes a portion that may troubleshoot a number of different operations. According to a preferred example, troubleshooting may occur 1) during SBW controlling operations that include clutch disengagement, e.g., a reactive-force controlling operation or a turning controlling operation, 2) during electric power steering (hereunder referred to as "EPS") controlling operations such as a torque assist controlling operation that includes clutch engagement, and/or 3) during switching between SBW and EPS controlling operations.

Each controlling section 19 preferably also includes a reactive-force command value calculating section, a reactive-force motor driving section, an operating-device electrical current sensor, a turning-command value calculating section, a turning motor driving section, and a turning device electrical current sensor. Each controlling section 19 may further include a diagnosing section to confirm the operations of the other controlling section 19. The controlling sections 19 are connected to each other so as to allow exchange of information there between through a bi-directional communication wire 20.

Information from sensors that are not shown, such as a yaw-rate/lateral-acceleration sensor, a vehicle-speed sensor that detects vehicle speed, and a reactive-force-motor temperature sensor that detects the temperature of the reactive-force motor 5, may also be input to the controlling sections 19.

Backup Clutch

Figure 2:
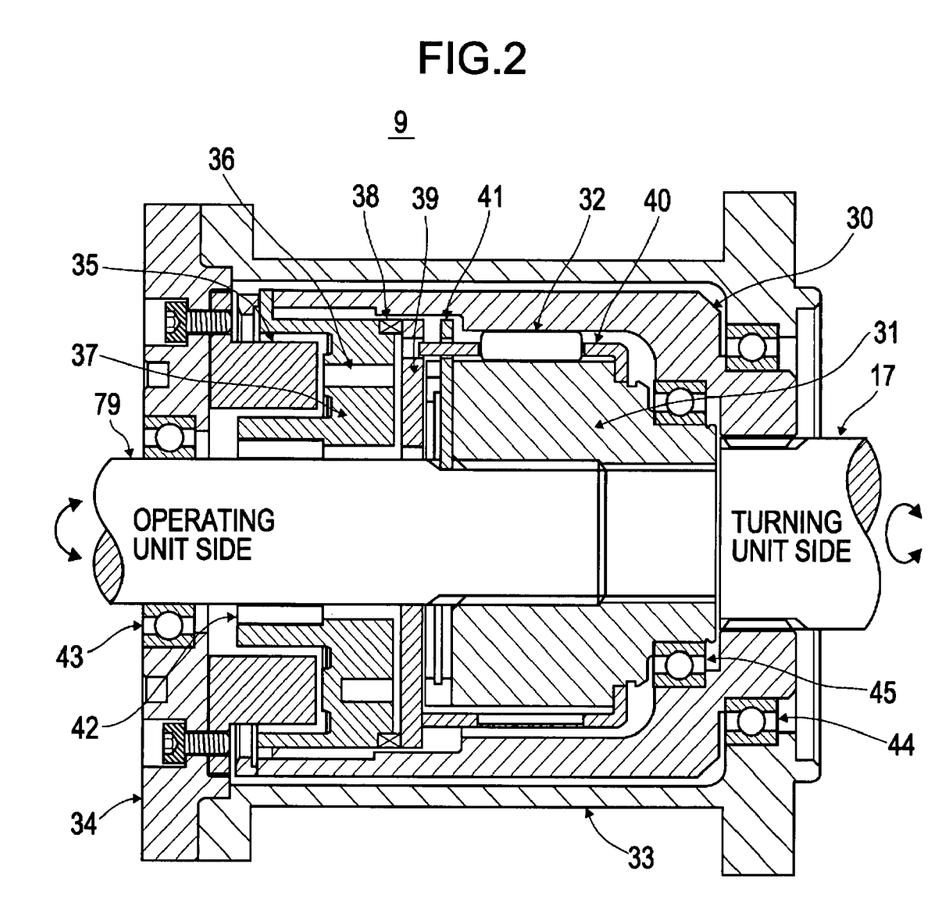
FIG. 2 is a sectional view of a backup clutch in the vehicle steering device shown in FIG. 1.
Figure 3:
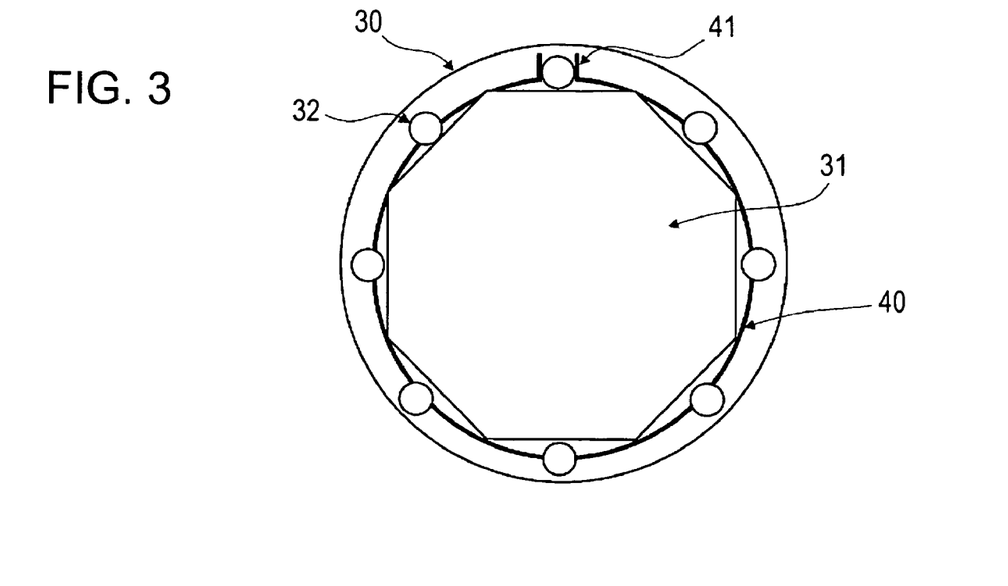
FIG. 3 illustrates a mechanical clutch for the backup clutch shown in FIG. 2.

FIG. 2 is a sectional view of the backup clutch 9 for the SBW system shown in FIG. 1. FIG. 3 shows a mechanical clutch (also called an "engaging device") of the backup clutch 9 shown in FIG. 2.

The backup clutch 9 is preferably disposed at the side of the turning device, and engages and disengages the operating device with respect to the turning device.

The backup clutch 9 includes an outer ring 30 (also called a "second rotary member"), an inner ring 31 (also called an "first rotary member"), an exciter that generates a magnetic force and preferably includes an electromagnetic coil 35 and a rotor 37, rollers 32, a holding unit 40, and a neutral spring 41. The rollers 32 are mechanical clutch elements, which are actuated in response to the electromagnetic coil 35 and the rotor 37, to engage or disengage the outer ring 30 and inner ring 31 with respect to each other. As shown in FIG. 2, the rollers 32, the holding unit 40, and the neutral spring 41 are supported so as to rotate with the inner ring 31. However, the rollers 32, the holding unit 40, and the neutral spring 41 may be supported to rotate with either the inner ring 31 or the outer ring 32, whichever has a lower rotational speed. The inner ring 31 is coupled for rotation with the pulley shaft 79 of the backup device, which rotates with the operating device. The outer ring 30 is coupled for rotation with the pinion shaft 17.

The pulley shaft 79 and the inner ring 31 may be secured by any known technique, such as with splines. Similarly, the pinion shaft 17 and the outer ring 30 may be secured by any known technique, such as with splines.

Referring also to FIG. 3, an inner peripheral surface of the outer ring 30 is cylindrical, and the outer peripheral surface of the inner ring 31 has a cam form (e.g., an octagonal form). FIG. 3 shows eight cams that are formed on the outer peripheral surface of the inner ring 31. Each of the eight cams includes a flat and a ridge, although other cam forms are envisioned. Of course, more or less than eight cams may be formed on the outer peripheral surface of the inner ring 31. The mechanical clutch includes the rollers 32 (also called "engagers"), which are interposed between the inner peripheral surface of the outer ring 30 and the outer peripheral surface of the inner ring 31.

The backup clutch 9 is brought into a disengaged condition (also called "disengagement") when electrical current is passed through the electromagnetic coil 35. That is, electrical current is supplied to the electromagnetic coil 35 to produce an electromagnetic force that cancels a magnetic force produced by a permanent magnet 36. In turn, when the magnetic force of a permanent magnet 36 is cancelled, the rollers 32 are disposed at their neutral positions, e.g., at middle of each cam flat, to allow relative rotation between the outer ring 30 and the inner ring 31. Accordingly, when the backup clutch 9 is in a disengaged condition, the rollers 32 do not mutually engage the outer ring 30 and the inner ring 31, and the turning device is disengaged from the operating device. On the other hand, the backup clutch 9 is brought into an engaged condition (also called "engagement) when electrical current is not passed through the electromagnetic coil 35. In engagement, the presence of the magnetic force produced by the permanent magnet 36 causes the rollers 32 to be displaced from their neutral positions so that the rollers 32 become wedged between the outer ring 30 and the inner ring 31.

As shown in FIG. 2, the electromagnetic coil 35 is secured to an end plate 34 (also called a "clutch case member") of a clutch case 33. The rotor 37 is secured for rotation, e.g., with splines, with an end of the outer ring 30, and the permanent magnet 36 is disposed so as to lie in a magnetic field of the electromagnetic coil 35.

Insofar as the permanent magnet 36 is disposed in the magnetic field of the electromagnetic coil 35, it is possible to generate with the electromagnetic coil 35 magnetic flux of the same phase or of the opposite phase to magnetic flux of the permanent magnet 36.

As shown in FIG. 2, the mechanical clutch includes an armature 39, the rollers 32, and the holding unit 40. The armature 39 is disposed so as to move axially with respect to the rotor 37. A separation spring 38 biases the armature 39 away from the rotor. The rollers 32 (eight are shown in the example) are interposed as engagers between the outer ring 30 and the inner ring 31. The holding unit 40 loosely retains the rollers 32 in respective pockets so as to maintain an equiangular interval between each of the rollers 32. The holding unit 40 is supported for rotation with the inner ring 31.

As shown in FIG. 3, when the backup clutch 9 in the disengaged condition, a neutral spring 41 cooperates with respect to one of the rollers 32 to bias the rollers 32 and the holding unit 40 toward the neutral position. During a transition from engagement of the backup clutch 9 to disengagement of the backup clutch 9, the neutral spring 41 applies a restoring spring force that biases the rollers 32 from being wedged between the outer ring 30 and the inner ring 31 toward the neutral position. Preferably, the neutral spring 41 is secured to the inner ring 31.

A needle bearing 42 may be provided between the pulley shaft 79 (also called a "shaft member"), which is coupled for rotation with the inner ring 31, and the rotor 37, which is coupled for rotation to an end of the outer ring 30.

As shown in FIG. 2, a first ball bearing 43 supports the pulley shaft 79 for rotation with respect to the end plate 34, a second ball bearing 44 supports the outer ring 30 for rotation with respect to the clutch case 33, and a third ball bearing 45 is interposed between the outer ring 30 and the inner ring 31.

Next, operations will be described.

If a defect occurs in the reactive-force motor 5 of the SBW system, a reactive-force control operation is stopped and engagement by the backup clutch 9 mechanically connects the steering wheel 6 to the steering controlled vehicle wheels 16. Thus, a backup mechanism is provided to mechanically transmit the rotation of the steering wheel 6 to the pinion shaft 17, and a controlling operation of the turning motors 14 is implemented that is similar to a steering auxiliary controlling operation in a conventional electric power steering device.

Clutch Engagement

The backup clutch 9 is brought into the engaged condition when an OFF command is output to the electromagnetic coil 35, thereby eliminating the magnetic force produced by the electromagnetic coil 35. Therefore, magnetic force of the permanent magnet 36, which is mounted to the rotor 37, becomes greater than spring force of the separation spring 38, which is disposed between the rotor 37 and the armature 39. This causes the armature 39 to be attracted to the rotor 37 and to rotate along with the rotor 37 by virtue of friction force engagement. The rotation of the armature 39 rotates the holding unit 40 and the rollers 32 against the spring force of the neutral spring 41, and the rollers 32 become wedged between the outer ring 30 and the inner ring 31 such that torque is transmitted between the outer ring 30 and the inner ring 31.

Clutch Disengagement

The backup clutch 9 is brought into the disengaged condition when an ON command is output to the electromagnetic coil 35, such that the electromagnetic coil 35 produces the electromagnetic magnetic force that cancels the magnetic force of the permanent magnet 36. The spring force of the separation spring 38, which is mounted to the armature 39, overcomes the magnetic force of the permanent magnet 36 so that the rotor 37 and the armature 39 separate from each other. As the friction force between the rotor 37 and the armature 39 disappears, the neutral spring 41 biases the rollers 32 to the neutral position. Therefore, the rollers 32 are no longer wedged between the outer ring 30 and the inner ring 31 such that torque is no longer transmitted between the outer ring 30 and the inner ring 31.

Accordingly, the SBW system including the backup clutch 9 provides two important operations: 1) performing a fail-safe operation by clutch engagement when a power supply is off, and 2) reducing vibration when the size is small, the torque is large, or engagement is performed.

Since the holding unit, the rollers, and the armature that are coupled to rotate with the inner ring 31 each have mass, inertial torque is generated when the inner ring 31 is rotated during engagement.

In contrast, related art devices may link an inner ring to a rotary shaft so as to rotate with the turning device, and link the outer ring to a rotary shaft so as to rotate with the operating device. Therefore, when clutch disengagement is performed in controlling a variable gear ratio vehicle steering device, for example, and when a turning angle change is large compared to a steering angle change, the inner ring rotates faster than the outer ring. This spreads the neutral spring holding the roller at the neutral position, causing the rollers and the holding unit to move from the neutral positions to the engagement positions. This results in an erroneous wedge engagement (also called "misengagement"). Additionally, the steering device side or the turning device side may be dragged, i.e., not fully engaged by the clutch mechanism, until any rotational speed differences are resolved. Therefore, when there is misengagement in the related art, the variable gear ratio switches to a mechanical gear ratio, which temporarily reduces the turning angle change. This may result in driver experiencing an uncomfortable feeling that there is a lack of turning amount.

Operation of Backup Clutch

Thus, it is desirable to overcome the problems of the related art by reducing the frequency of misengagement in the backup clutch 9. That is, when performing clutch disengagement for separating the outer ring 30 and the inner ring 31 from each other, it is desirable to prevent a driver from experiencing an uncomfortable feeling or having to stabilize the behavior of a vehicle when misengagement occurs.

Operations for reducing the occurrence of misengagement when performing clutch disengagement in the vehicle steering device will hereunder be described.

Operations for Reducing Occurrence of Misengagement During Disengagement

Figure 4:
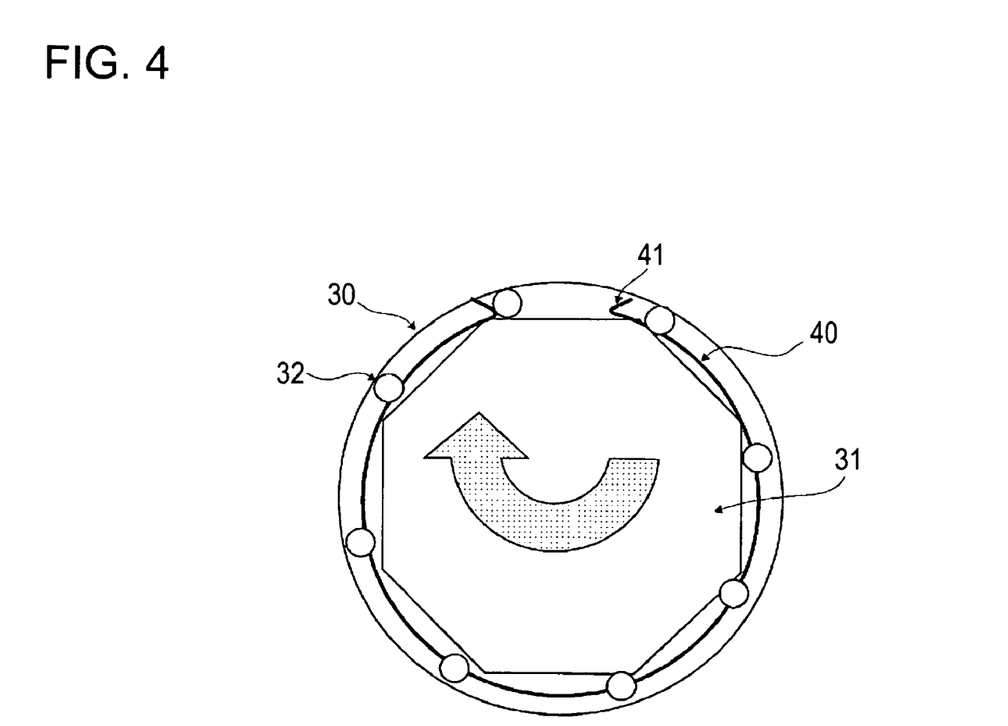
FIG. 4 illustrates misengagement that may occur when disengaging the backup clutch shown in FIG. 2.

Misengagement that occurs when performing clutch disengagement depends largely on the inertia of, for example, the roller 32 with which the neutral spring 41 cooperates when the clutch is disengaged. When inertial torque that is generated by sudden acceleration is large with respect to the spring force of the neutral spring 41, the rollers 32 move from the neutral positions to the engagement positions, thereby causing the misengagement. With reference to FIG. 4, neutral spring 41 may be spread due to high rotational speed of the inner ring 31 relative to the outer ring 30. Inertia causes movement of the rollers 32 and of the holding unit 40, whereupon the rollers 32 cause engagement between the outer ring 30 and the inner ring 31.

Focusing on the fact that misengagement results from the components of the mechanical clutch that have inertia, e.g., the holding unit 40, the rollers 32, and the armature 39, and on the fact that misengagement results from sudden acceleration, the mechanical clutch is provided at the inner ring 31 that rotates along with the operating device that has a small rotation-angle change. This makes it possible to reduce the occurrence of misengagement when performing clutch disengagement.

If the mechanical clutch were to rotate with the member that has a larger rotation-angle change, then during clutch disengagement the frequency with which the rotation-angle change is increased becomes high. And with increased rotation-angle changes, inertial torque may cause misengagement.

In contrast, the mechanical clutch is provided at the inner ring 31 having a small rotation-angle change: therefore it is possible to reduce the occurrence of misengagement of the backup clutch 9. Accordingly, it is possible for a driver to avoid experiencing an uncomfortable feeling or to have to stabilize the behavior of a vehicle.

Incidentally, in controlling a variable gear ratio vehicle steering device, the angular acceleration of the turning device approaches a value that is five times the angular acceleration of the operating device. Accordingly, by providing the mechanical clutch at the inner ring 31 that rotates with the operating device having a small rotation-angle change, it is possible to reduce the occurrence of misengagement when performing clutch disengagement.

When, for example, a SBW controlling operation is applied to a variable gear ratio vehicle steering device wherein the gear ratio is varied based on vehicle speed, the lower the vehicle speed is, the higher the gear ratio. In ordinary driving of a vehicle, the frequency with which the vehicle is driven in a range of a low speed to an intermediate speed is overwhelmingly high. Thus, the rotation-angle change in the operating unit is small, whereas the rotation-angle change of the turning unit is large.

However, the mechanical clutch is provided at the inner ring 31 that rotates with the operating device. Thus, it is possible to reduce the occurrence of misengagement of the backup clutch 9 when performing clutch disengagement for performing a gear ratio controlling operation as a SBW controlling operation.

The needle bearing 42 is provided between the pulley shaft 79 of the operating device, which is preferably coupled by splines to the inner ring 31, and the rotor 37, which is secured to an end of the outer ring 30.

Thus, by providing the needle bearing 42 between the pulley shaft 79 (at the inner ring 31 side) and the rotor 37 (at the outer ring 30 side), the outer ring 30 and the inner ring 31 are supported at respective ends by the needle bearing 42 (i.e., at the end proximate the operating unit) and by the third ball bearing 45 (i.e., at the end proximate the turning unit). This reduces play, which may be caused by a mounting angle of the backup clutch 9, between the rotary shaft at the inner ring 31 and the rotary shaft at the outer ring 30, and reduces play between the two shafts, which may be caused by, for example, vibration of the vehicle body. Therefore, regardless of the clutch mounting angle, vibration, any other cause, a certain clearance is provided between the outer ring 30 and the inner ring 31.

Consequently, it is possible to reduce misengagement of the backup clutch 9 when performing clutch disengagement.

Figure 5:
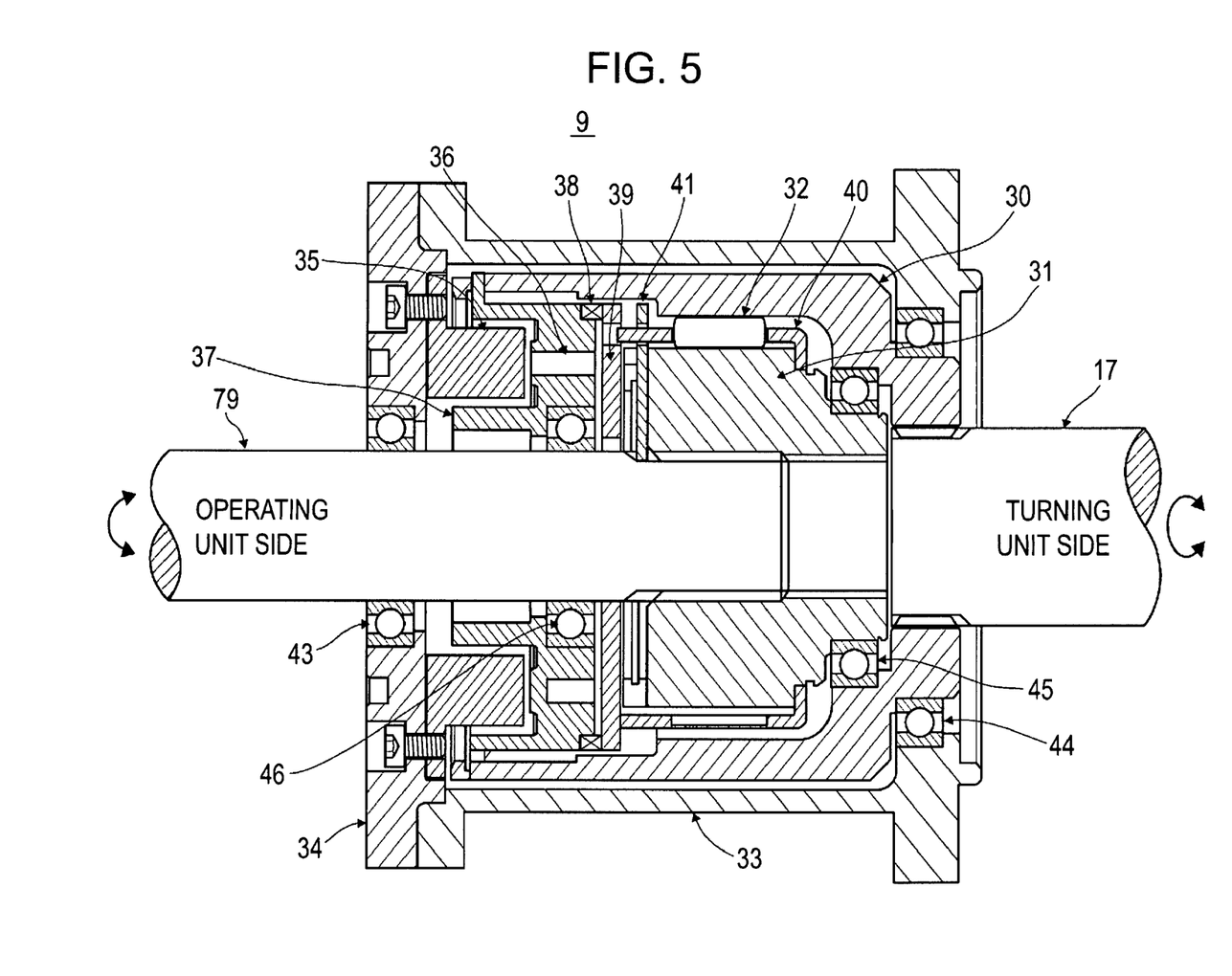
FIG. 5 is a sectional view of a backup clutch.

FIG. 5 shows a ball bearing installed in a deep groove that is provided instead of the needle bearing 42. A fourth ball bearing 46 set into a deep groove provided in the rotor 37 is disposed between the pulley shaft 79 of the operating device, which is coupled by splines for rotation to the inner ring 31, and the rotor 37, which is coupled by splines for rotation to the outer ring 30. The other structural features that are identified with the same reference numbers as were used in connection with FIG. 2 are similar and their description will not be repeated.

Next, an operation of a vehicle steering device that includes the fourth ball bearing 46, which is set in the deep groove, will be described.

As compared to the needle bearing 42, the radial vibration may be further reduced. That is, by providing the fourth ball bearing 46 disposed between the pulley shaft 79 (at the inner ring 31 side) and the rotor 37 (at the outer ring 30 side), the outer ring 30 and the inner ring 31 are supported at respective ends. Radial vibration is reduced by virtue of the fourth ball bearing 46 being disposed at the end proximate the operating unit side and the third ball bearing 45 being disposed at the end proximate the turning unit side. The fourth ball bearing 46 as compared to the needle bearing 42, further reduces play between the rotary shaft at the inner ring 31 and the rotary shaft at the outer ring 30, which may be caused by either the mounting angle of the backup clutch 9, or vibration of the vehicle body. Therefore, regardless of the clutch mounting angle, vibration, or any other cause, a certain clearance is stably provided at all times between the outer ring 30 and the inner ring 31.

Accordingly, the fourth ball bearing 46 further reduces the occurrence of misengagement of the backup clutch 9 when performing clutch disengagement. The other operational features of the backup clutch shown in FIG. 5, which includes the fourth ball bearing 46, are the same as those according to the backup clutch shown in FIG. 2, which includes the needle bearing 42, and are not repeated.

Cable-End Supporting Structure

Figures 6A, 6B, 6C, 6D:
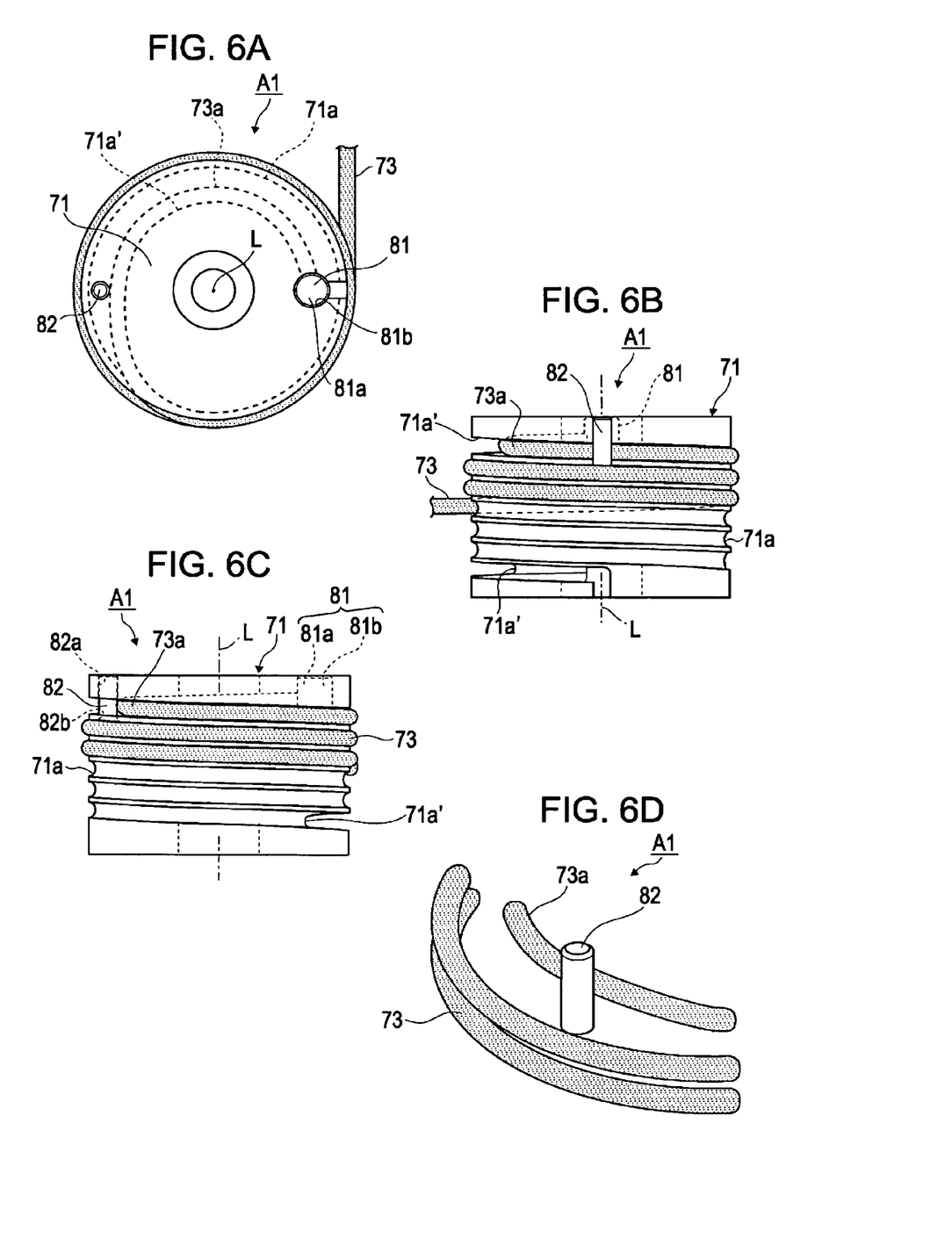
FIGS. 6A to 6D show a cable-end supporting structure for a cable steering device, with FIG. 6A being a plan view of a pulley, FIG. 6B being a side view of the pulley, FIG. 6C being a front view of the pulley, and FIG. 6D being a perspective view illustrating a restricting member in the cable-end supporting structure.

FIGS. 6A to 6D show a cable-end supporting structure in a cable steering device. FIG. 6A is a plan view of a pulley, FIG. 6B is a side view of the pulley, FIG. 6C is a front view of the pulley, and FIG. 6D is a perspective view of a restricting member.

In a cable steering device that is used as a backup mechanism of the SBW system, such as is shown in FIG. 1, as the steering wheel 6 is turned towards the left or right, a driver pulley and a driven pulley rotate together in the same direction. Common rotation of the pulleys 71 and 72 is provided by the two cables 73 and 74, whose ends are secured to the driver pulley and the driven pulley, such that the cables 73 and 74 are pulled/slackened relative to one another.

When the steering wheel 6 is steered from its neutral position, the pulley 71 at the operating device side is the driver pulley, and the pulley 72 at the turning device side is the driven pulley. The steering wheel 6 is returned to its neutral position by self-aligning torque that is generated at the steering controlled vehicle wheels 16 when, for example, the driver releases the steering wheel 6 from its steered state, whereupon the pulley 72 at the turning device side becomes the driver pulley, and the pulley 71 at the operating device side becomes the driven pulley. The pulleys 71 and 72 have the same structure. Accordingly, the cable-end supporting structure for only the pulley 71 as shown in FIG. 6 will be described.

A cable-end supporting structure A1 at the pulley 71 (also called a "cylindrical member) supports a cable end 73a of the cable 73. When the cable end 73a is rotated around a rotational axis L disposed at the center of the pulley 71 that supports the cable end 73a, the cable 73 is wound up along a winding groove 71a, which is helically formed on the outer peripheral surface of the pulley 71.

In the cable-end supporting structure A1, a restricting member 82 is provided at a location that is separated along the winding groove 71a by half a rotation of the pulley 71 from a securing portion 81 of the cable end 73a. The cable 73 is brought into contact with the winding groove 71a by the restricting member 82 as will be described below.

In the securing portion 81, a pin 81a is secured to the cable end 73a by, for example, casting or caulking, and is secured in a hole 81b that is formed in an end surface of the pulley 71. The hole 81b extends parallel to the direction of the rotational axis L.

Selection of the location of the restricting member 82 is based on the opposing tensile force that is generated when the cable 73 is wound up. Specifically, the restricting member 82 is disposed at a location corresponding to where the friction force due to contact between the winding groove 71a and the portion of the cable 73 that extends between the restricting member 82 and the securing portion 81 can oppose a tensile force that is generated when the cable 73 is wound on the pulley 71. As shown in FIG. 6, the restricting member 82 is set at a location that is separated from the securing portion 81 by a deep winding groove portion 71a'. The deep winding groove portion 71a' extends approximately one-half rotation, i.e., approximately one half of the circumference around the pulley 71, or approximately 180 degrees.

Of the winding groove 71a in the outer peripheral surface of the pulley 71, the deep winding groove portion 71a' extending from the securing portion 81 of the cable end 73a to at least the restricting member 82 is deeper than the other portions of the winding groove 71a.

The restricting member 82 is disposed at a distance relative to the rotational axis L so as to be separated from the deep winding groove portion 71a' by an amount corresponding to the diameter of the cable. Thus, the restricting member 82 causes the cable 73 to be sandwiched between the restricting member 82 and the deep winding groove portion 71a' and to contact the deep winding groove portion 71a'.

As shown in FIG. 6A, an amount corresponding to approximately one-quarter of a rotation from the restricting member 82 is set to gradually restore the depth of the deep winding groove portion 71a' to the nominal groove depth of a majority of the winding groove 71a. Therefore, the deep winding groove portions 71a' are defined as extending approximately three-quarters of the rotation along portions of the groove that are disposed proximate to each of a top surface and a bottom surface of the pulley 71. A central portion of the winding groove 71a is disposed between and connects the deep winding groove portions 71a' at either end of the winding groove. The central portion of the winding groove may include a plurality of rotations; approximately 4.5 rotations are shown in FIG. 6.

The restricting member 82 is inserted, parallel to the direction of the rotational axis L, into an end surface of the pulley 71 and passes through the deep winding groove portion 71a' to set the restricting member 82 in the pulley 71. That is, the restricting member 82 passes through a top hole portion 82a and extends into a bottom hole portion 82b, both of which are formed in the pulley 71. In between the top hole portion 82a and the bottom hole portion 82b, the restricting member 82 passes through the deep winding groove portion 71a'. Preferably, the restricting member 82 includes a cylindrical pin, e.g., a set pin that is press-fitted in the pulley 71.

Next, operations will be described.

The SBW system uses a cable backup mechanism such that, when a defect occurs in the reactive-force motor 5, reactive-force control is stopped and the backup clutch 9 is engaged to mechanically link together the steering wheel 6 and the steering controlled vehicle wheels 16 via the cable column 7, thereby providing a backup mechanism. The rotation of the steering wheel 6 is transmitted to the pinion shaft 17, so that the steering controlled vehicle wheels 16 can be pivoted.

In the cable steering device, when the steering wheel 6 is turned toward the right, for example, the driver pulley 71 is rotated in the same direction so that the cable 73 is wound on the driver pulley 71. Winding of the cable 73 on the driver pulley 71 causes the cable 73 to be unwound off the driven pulley 72, and thereby rotates the driven pulley in the same direction. Concurrently, the cable 74 is unwound off the driver pulley and wound on the driven pulley 72. This causes the rack shaft 15b of the steering mechanism 15 to slide in the opposite direction, i.e., toward the left, so that the steering controlled vehicle wheels 16 are pivoted toward the right. In contrast, if the steering wheel 6 is turned toward the left, the steering controlled vehicle wheels 16 can be turned to the left by reverse operations.

As the steering wheel 6 is turned to either of its left/right maximum rotation position, the driver pulley 71 and the driven pulley 72 rotate together in the same direction. The rotations of the pulleys 71 and 72 cause the cables 73 and 74 to be pulled (i.e., during winding) and slackened (i.e., during unwinding) relative to each other so that the cable 73 is increasingly slackened from the driven pulley 72 and is pulled toward the driver pulley 71 and, at the same time, the cable 74 is increasingly slackened from the driver pulley 71 and is pulled toward the driven pulley 72.

In the related art, when winding a cable on a winding groove of a pulley, the cable is always wound upon the pulley two or more times. That is to say, there are always at least two coils of the cable wound on the pulley, regardless of whether a driver has turned a steering wheel to a maximum rotation position. Accordingly, the friction force between the cable and the pulley, even if the steering wheel reaches either of its left/right maximum rotation position, prevents an excessive load from acting upon the cable, a pin, or a pin securing portion of the pulley. In addition, when the steering wheel in the related art is turned in the opposite direction from either of the left/right maximum rotation position, tension in a cable is released which may allow the cable to rise from a winding groove of the pulley and thereby release the friction force that was preventing an excessive load.

Further, since the cable in the related art is always wound upon the pulley two or more times, the overall length of the pulley in the axial direction thereof is increased, thereby increasing the overall size of the steering device. In addition, the overall additional length required for winding the cable two or more times also increases the weight of the pulley and of the steering device.

Cable-End Supporting Operation

It is possible to overcome the problems of the related art by providing a cable steering device including a pulley 71 that is reduced in size and weight, and cables 73 and 74 that are prevented from rising from the winding groove 71a of the pulley 71, thereby enhancing durability of the cable steering device and achieving smooth winding.

Size and weight reduction, mounting, preventing the cables from rising, and the like will be described hereunder.

Size and Weight Reduction

The cable steering device preferably uses the cable-end supporting structure A1 in which the restricting member 82 is separated along the winding groove 71a by half the rotation of the pulley 71 from the securing portion 81 of the cable end 73a, and in which the cable 73 is sandwiched into contact with the winding groove 71a by the restricting member 82.

Accordingly, for cable steering devices it is not necessary to always wind each cable, even at the slackening side, two or more times upon the pulley, as it is necessary in the related art. Each cable only needs to be wound by an amount corresponding to half the rotation of the pulley at the location where the restricting member 82 is set. Therefore, the overall length of the pulley 71 in the axial direction is reduced, and the overall weight of the pulley 71 is reduced. In addition, the overall lengths of the cables 73 and 74 may also by reduced, thereby affording a further reduction in weight of the cable steering device.

Mounting of the cable 73 to the pulley 71 is achieved as follows. The pin 81a, which is secured to the cable end 73a, is inserted in the hole 81b in the end surface of the pulley 71. Then, the cable 73 is wound along the corresponding deep winding groove portion 71a' (i.e., one of the two portions of the winding groove 71a having a large depth). Then, in a direction parallel to the rotational axis L, the restricting member 82 is inserted through the top hole 82a in the end surface of the pulley 71, is passed through the deep winding groove portion 71a', and is inserted in the bottom hole 82b.

By the above-described mounting operation, at a minimum winding position of the cable 73, the restricting member 82 applies a contact force to the inner cable 73 so that the cable 73 contacts the deep winding groove portion 71a', thereby restricting the rising of the cable 73 from the deep winding groove portion 71a'.

In response to rotation of the steering wheel towards either the left or right, the cable 73 is wound upon the pulley 71 or is slackened from the pulley 71. When the steering wheel 6 is at either of its left/right maximum rotation positions, the cable 73 at the slackening side is wound upon the pulley 71a minimum number of times, which is the distance along the deep winding groove portion 71a' from the securing portion 81 of the cable end 73a to the restricting member (corresponding to approximately one-half the rotation of the pulley).

Therefore, even if the steering wheel 6 reaches either of its maximum rotation positions, the restricting member 82 ensures that the cable 73 remains wound upon the pulley 71 by at least half the rotation of the pulley, and it prevents the cable 73 from rising from the winding groove 71a. A portion extending to approximately three-quarters of the rotation of the pulley from the half-rotation of the pulley (i.e., at the minimum number of windings) varies in size between the size of the deep winding groove portion 71a' and the other portions of the winding groove 71a. Since the rotation ratio changes when the size changes, rotation control is performed to limit the amount of the rotation that is unused to correspond to three-quarters of the rotation.

By preventing the rising of the cable 73, for example, it is possible to overcome the problem that the cable 73 at the slackening side to be wound upon the pulley 71 is not wound upon the pulley 71 due to the rotation of the pulley 71 in the opposite direction as the steering wheel 6 is returning to its neutral position from its left/right maximum rotation position.

By preventing the cable 73 from rising, for example, it is possible to prevent damage to the cable 73 due to contact with the inner surface of the pulley casing 75 or due to not being properly wound along the winding groove 71a of the pulley 71.

In the range extending from the securing portion 81 of the cable end 73a to the location where the cable 73 is wound a minimum number of times (that is, the location of the restricting member 82 which corresponds to half the rotation of the pulley), the friction force acting between the cable 73 and the deep winding groove portion 71a' supports a tensile force on the cable 73 at the slackening side, so that an excessive load is not applied to the cable 73, the pin 81a at the cable end 73a, or the hole 81b in the pulley 71. This enhances the durability of the pulley 71 and the cable 73. Since the restricting member 82 is a cylindrical pin, friction between it and the cable 73 is small, and it is possible to avoid scratching of the outer surface of the cable 73 by the restricting member 82. In addition, since the restricting member 82 is firmly secured to the pulley 71, it is strong enough to apply sufficient contact force to the cable 73 so that the cable 73 does not rise.

As described above, in the cable-end supporting structure A1 of the cable steering device, the restricting member 82 is provided at the location that is separated from the securing portion 81 of the cable end 73a along the winding groove 71a by half the rotation of the pulley, and the cable 73 is brought into contact with the deep winding groove portion 71a' by the restricting member 82. Therefore, the size and weight of the pulley 71 are reduced, and rising of the cable 73 is prevented. Further, while reducing the size and weight of the pulley 71, rising of the cables 73 and 74 from the winding groove 71a is prevented, thereby making it possible to increase durability and to achieve smooth winding.

The location of the restricting member 82, i.e., separated along the winding groove 71a from the securing portion 81 by half the rotation of the pulley 71, may be an optimal location where the friction force of the winding groove 71a on the cable 73 supports a tensile force acting on the cable 73, and the pulley 71 is reduced in size and weight.

The restricting member 82 is disposed with respect to the rotational axis L such that the restricting member 82 is separated from the deep winding groove portion 71a' by an amount corresponding to the diameter of the cable. Thus, the restricting member 82 causes the cable 73 to contact the deep winding groove portion 71a' and to be sandwiched between the restricting member 82 and the deep winding groove portion 71a'.

For example, if a resisting force by a restricting member that causes a cable to contact a winding groove is weak, and an excessive input that exceeds the restricting force is applied to the cable, the cable may not be prevented from rising from the winding groove.

In contrast, even if an excessive input is applied by the cable 73, the restricting member 82, which performs a restricting operation by applying a contact force to the cable 73, sandwiches the cable 73 between the restricting member 82 and the deep winding groove portion 71a', and causes the cable 73 to contact the deep winding groove portion 71a' so as to reliably prevent the cable 73 from rising out of the deep winding groove portion 71a'.

The winding groove 71a in the outer peripheral surface of the pulley 71 includes a pair of deep winding groove portions 71a', which are deeper than the rest of the winding groove 71a, that extend from the securing portion 81 of the cable end 73a to at least the restricting member 82.

For example, if an attempt is made to provide a restricting member that restricts rising of a cable by a sandwiching and contacting operation, but is disposed with respect to a pulley having a uniform winding groove of unvarying depth, it is necessary to increase a portion of or the entire outer diameter of upper and lower portions of the pulley in order to provide space for setting the restricting member.

In contrast, the deep winding groove portion 71a' extending from the securing portion 81 of the cable end 73a to at least the restricting member 82 is deeper than the rest of the winding groove 71*a*. Thus, the restricting member 82 can be set without changing the outside diameter of the pulley 71. As a result, the restricting member 82 does not require a change in the design of the pulley housings 75 and 76.

Preferably, the restricting member 82 is set at the pulley 71 by inserting it, parallel to the direction of the rotational axis L, through the end surface of the pulley 71, and passing it through the deep winding groove portion 71*a*′.

For example, when a restricting member is a separate unit member having a pin previously secured to a bracket, and the separate unit member is secured to the pulley with, for example, a screw, the number of parts is increased, as a result of which costs are increased and mountability is reduced.

In contrast, since it is possible to set the restricting member 82 at the pulley 71 by only inserting the restricting member 82 into the pulley 71, it is possible to properly mount the restricting member at a low cost while providing a securing strength that allows sufficient contact force to be applied.

Preferably, the restricting member 82 is a cylindrical pin that is set at the pulley 71.

For example, if a restricting member is a polygonal columnar pin, the friction resulting from a contact force acting on a cable may be too large, and the outer surface of the cable may be scratched.

Preferably, the restricting member 82 is a cylindrical pin, so that even if contact forces frequently acts upon the cable 73, it is possible to avoid scratching the outer surface of the cable 73.

Preferably, there is provided a restricting member 83 that restrains the cable 73 at a location where the cable 73 contacts the winding groove 71*a*.

First, a structure will be described.

Figure 7A:
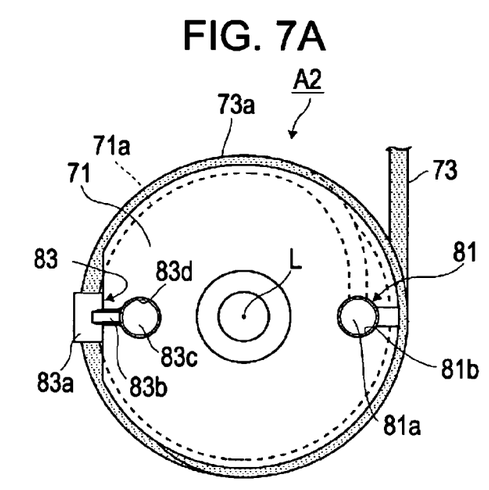
FIGS. 7A to 7D show a cable-end supporting structure for a cable steering device, with FIG. 7A being a plan view of a pulley, FIG. 7B being a side view of the pulley, FIG. 7C being a front view of the pulley, and FIG. 7D being a perspective view illustrating a restricting member in the cable-end supporting structure.
Figure 7B:
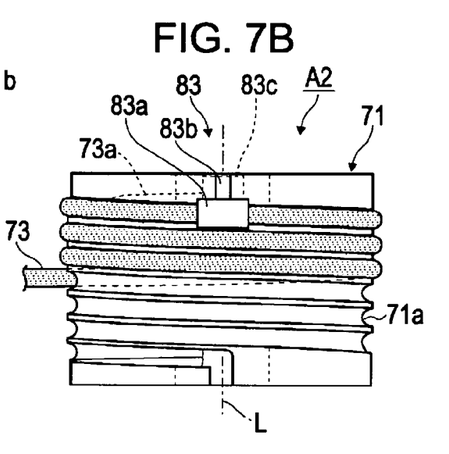
Figure 7C:
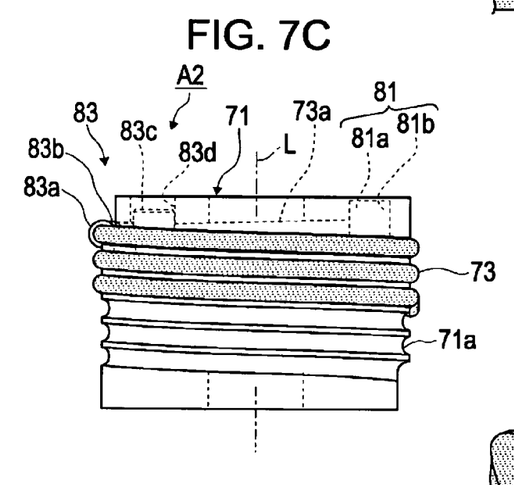
Figure 7D:
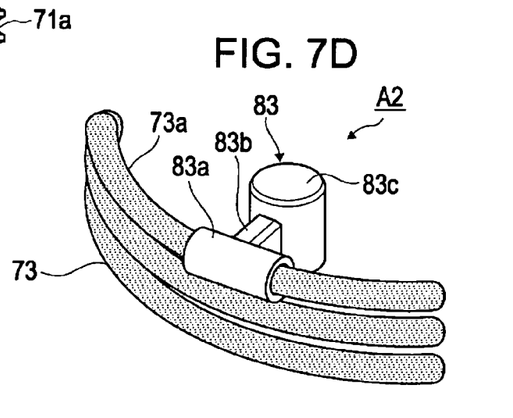

FIGS. 7A to 7D show a cable-end supporting structure in a cable steering device. FIG. 7A is a plan view of a pulley, FIG. 7B is a side view of the pulley, FIG. 7C is a front view of the pulley, and FIG. 7D is a perspective view of a restricting member.

The cable steering device preferably has a cable-end supporting structure A2 in which the cable end 73*a* of the cable 73 is supported by the pulley 71 (also called a "cylindrical member"). When the cable end 73*a* is rotated around the rotational axis L of the pulley 71 that supports the cable end 73*a*, the cable 73 is wound up along the winding groove 71*a*, which is helically formed in the outer peripheral surface of the pulley 71.

In the cable-end supporting structure A2, the restricting member 83 is provided at a location that is separated along the winding groove 71*a* by half a rotation of the pulley from the securing portion 81 of the cable end 73*a*, and the cable 73 is brought into contact with the winding groove 71*a* by the restricting member 83.

As shown in FIG. 7, the restricting member 83 is set at a location that is separated from the securing portion 81 of the cable end 73*a* by a minimum winding length of the cable 73 such that a friction force that supports the tensile force of the cable 73 is provided. The restricting member 83 is separated from the securing portion 81 along the winding groove 71*a* by approximately half the rotation (that is, approximately 180 degrees).

The restricting member 83, which is provided at the cable 73, restrains the cable 73 at the location where the cable 73 contacts the winding groove 71*a*.

The restricting member 83 includes a ring member 83*a*, which restrains the entire periphery of the cable 73, and a securing pin 83*c*, which is connected to the ring member 83*a* through a connector 83*b*. The connector 83*b* and the securing pin 83*c* are set at the pulley 71 by inserting them in a direction parallel to the rotational axis L and into an end surface of the pulley 71.

Here, the ring member 83*a* is secured to a predetermined location of the cable 73 by casting or caulking. An insertion hole 83*d* for inserting the securing pin 83*c* and the connector 83*b* is formed in the pulley 71. The other structural features shown in FIG. 7 are the same as those shown in FIG. 6, and will not be repeated below.

Next, operations will be described.

For example, a mounting operation and operation that prevents rising of the cable 73 by the cable-end supporting structure A2 will be described.

Mounting Operation

In mounting the cable 73 to the pulley 71, the pin 81*a* that is secured to the cable end 73*a* is secured to the hole 81*b* in the end surface of the pulley 71. Then, the cable 73 is wound along the winding groove 71*a* at the outer peripheral surface of the pulley 71. Thereafter, at a location that is separated from the cable end 73*a* by a predetermined length, the securing pin 83*c* and the connector 83*b* of the restricting member 83, which includes the ring member 83*a* that is previously secured to the cable 73, are inserted into an insertion hole 83*d* that is formed in the end surface of the pulley 71. The restricting member 83 is inserted in a direction parallel to the rotational axis L.

By the above-described mounting operation, at the minimum winding location of the cable 73, the restricting member 83 restrains the cable 73 at the location where the cable 73 contacts the winding groove 71*a*, so that the rising of the cable 73 from the winding groove 71*a* is avoided.

Prevention of Rising of Cable.

By rotating the pulley 71 that is coupled for rotation with the steering wheel 6 towards the left or right, the cable 73 is wound upon the pulley 71 or is slackened from the pulley 71. When the steering wheel 6 is at either of its left or right maximum rotation positions, the cable 73 at the slackening side can be wound upon the pulley 71 only up to the location at which the cable 73 is wound a minimum number of times from the securing portion 81 of the cable end 73*a* (that is, up to the location corresponding to half the rotation of the pulley).

Therefore, even if the steering wheel 6 reaches either of its maximum rotation positions, the restricting member 83 ensures that the cable 73 is always wound upon the pulley 71 by at least half the rotation of the pulley, so that it is possible to prevent the cable 73 from rising from the winding groove 71*a*.

By preventing the rising of the cable 73, it is possible to overcome the problem that the cable 73 at the slackening side to be wound upon the pulley 71 is not wound upon the pulley 71 due to the rotation of the pulley 71 in the opposite direction as the steering wheel 6 is returning to its neutral position from its left/right maximum rotation position.

By preventing the cable 73 from rising, for example, it is possible to prevent damage to the cable 73 due to contact with the inner surface of the pulley casing 75 or due to not being properly wound along the winding groove 71*a* of the pulley 71.

In the range extending from the securing portion 81 of the cable end 73*a* to the location where the cable 73 is wound a minimum amount (that is, the location corresponding to half the rotation of the pulley), the friction force acting between the cable 73 and the winding groove 71*a* opposes a tensile force of the cable 73 at the slackening side, so that an excessive load is not applied to the cable 73, the pin 81*a* at the cable end 73*a*, or the hole 81*b* in the pulley 71. This enhances the durability of the pulley 71 and the cable 73.

The restricting member 83 includes the ring member 83*a*, the connector 83*b*, and the securing pin 83*c*. The sum of a friction force that results from, for example, caulking the ring member 83*a* to the cable 73 and a supporting force that secures the connector 83*b* and the securing pin 83*c* to the insertion hole 83*d* of the pulley 71 are provided with respect to the tensile force of the cable 73, so that sufficient supporting strength that does not allow the cable 73 to rise is provided.

As described above, the restricting member 83 is provided at the cable 73 and restrains the cable 73 at the location where it contacts the winding groove 71*a*.

For example, if a resisting force by a restricting member that causes a cable to contact a winding groove is weak, and an excessive input that exceeds the restricting force is applied to the cable, the cable may not be prevented from rising from the winding groove.

In contrast, even if an excessive input is applied by the cable 73, the restricting member 83, which restrains the cable 73 at the location where it contacts the winding groove 71*a*, may provide even better performance than the restricting member 82, and can reliably prevent the cable 73 from rising out of the winding groove 71*a*.

Preferably, the restricting member 83 includes the ring member 83*a* that restrains the cable 73.

For example, when an attempt is made to restrain a portion of a cable, the restraining force on the cable is reduced. Unlike the restricting member 82, in which local rubbing between the restricting pin and the cable cannot be avoided, the ring member 83*a* that restrains the cable 73 provides a high restraining force and prevents local rubbing between the restricting member 83 and the cable 73.

The restricting member 83 includes the ring member 83*a*, and the securing pin 83*c* is connected to the ring member 83*a* through the connector 83*b*. The connector 83*b* and the securing pin 83*c* are set at the pulley 71 by inserting them into the end surface of the pulley 71 in a direction parallel to the rotational axis L.

When an attempt is made to secure the restricting member to the pulley with, for example, a screw, man-hours are required for the mounting operation, and mountability is reduced. Even with the restricting member 82, the form of the winding groove of the pulley needs to be changed.

Preferably, by only inserting the restricting member 83 into the end surface of the pulley 71, the restricting member 83 can be set with high mountability and can be used without changing the form of the winding groove 71*a* of the pulley 71.

As shown in FIG. 2, the mechanical clutch is provided at the inner ring 31 that rotates along with the operating device that has a smaller rotation-angle change among the rotation-angle changes of the operating device and the turning device. Depending upon a system or a controlling operation, the turning device may have a smaller rotation-angle change. In such cases, the mechanical clutch may be provided at the outer ring 30 that rotates along with the turning device having a smaller rotation-angle change. In short, it is envisioned that there is applicability to any structure as long as the structure is one in which the mechanical clutch is provided at the rotary member, which rotates along with the operating device or the turning device, that has a smaller rotation-angle change.

As also shown in FIG. 2, the exciter has a structure in which the permanent magnet 36 is disposed in a field of the electro-magnetic coil 35. However, an alternate structure may include the separation spring 38 being disposed between the inner ring 31 and the armature 37 and in which only the electro-magnetic coil 35 is provided. In short, as long as the structure is one in which, when the exciter is operated, the clutch is disengaged to allow relative rotation between the outer ring 30 and the inner ring 31, and in which, when the exciter is not operated, the clutch is engaged by wedging the rollers 32 between the outer ring 30 and the inner ring 31, it is possible to provide the two functions required of the backup clutch 9 in a SBW system. These functions are a fail-safe operation by clutch engagement when a power supply is OFF, and reducing vibration when the size is small, the torque is large, or engagement is performed.

As shown in FIG. 6, the restricting member 82 is disposed so as to oppose the winding groove at a location relative to the rotation axis L that is separated from the winding groove by an amount corresponding to the diameter of the cable. The restricting member 82 causes the cable 73 to be sandwiched between it and the deep winding groove portion 71*a*' and to contact the deep winding groove portion 71*a*'. As shown in FIG. 7, the restricting member 83 is provided at the cable 73 and restrains the cable 73 at a location where the cable 73 contacts the winding groove 71*a*. However, restricting members are not limited to restricting members 82 and 83. In short, as long as a restricting member is provided at a location that is separated along the winding groove by approximately half the rotation of the pulley from the securing portion of the cable end, and the restricting member causes the cable to contact the winding groove, it is envisioned that there is applicability for any such restricting members in addition to the restricting members 82 and 83.

Although the above descriptions are generally presented in connection with a SBW system having a backup clutch disposed at the turning unit, it is envisioned that there is additional applicability to a SBW system having a backup clutch disposed at the operating unit side. In addition, although the backup clutches shown in FIGS. 2 and 5 are described in connection with a SBW system using a cable column and a backup clutch as a backup device, it is also envisioned that there is additional applicability to a SBW system using a conventional articulated column shaft instead of a cable column, and using only a backup clutch as a backup device.

Although the cable-end supporting structures shown in FIGS. 6 and 7 are described in connection with a cable steering device that provides a backup mechanism to a SBW system, it is also envisioned that there is additional applicability in providing a degree of freedom in routing a torque transmission coupling between the steering wheel and the steering mechanism. It is further envisioned that there is additional applicability to any steering system that uses a cable, instead of a conventional articulated column shaft, for example, as a steering-power transmission system. In sum, it is envisioned that there is applicability to any device that supports an end of a cable on a cylindrical member, and in which the cable is wound along the outer peripheral surface of the cylindrical member when the end of the cable is rotated around a rotational axis of the cylindrical member.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A vehicle steering device that pivots at least one steering controlled vehicle wheel in response to a steering command, the vehicle steering device comprising:

an operating unit receiving the steering command;

a turning unit pivoting the at least one steering controlled vehicle wheel;

one of the operating unit and the turning unit including a first cylindrical member that rotates about a first axis of rotation and that has a first groove formed on a first outer peripheral surface;

the other the operating unit and the turning unit including a second cylindrical member that rotates about a second axis of rotation and that has a second groove formed on a second outer peripheral surface;

a cable extending between first and second ends, the first end being coupled to the first cylindrical member and the second end being coupled to the second cylindrical member, the cable including:
  a first portion extending a first predetermined length from the first end, the first portion lying in the first groove and being wound on the first outer peripheral surface; and
  a second portion extending a second predetermined length from the second end, the second portion lying in the second groove and being wound on the second outer peripheral surface; and a first restricting member rotating with the first cylinder and maintaining contiguous engagement between the first portion of the cable and the first groove, the first restricting member being spaced along the first portion from the first end.

2. The vehicle steering device according to claim 1, further comprising:
  a second restricting member rotating with the second cylinder and maintaining contiguous engagement between the second portion of the cable and the second groove, the second restricting member being spaced along the second portion from the second end.

3. The vehicle steering device according to claim 2, wherein the first restricting member comprises a first constraining member constraining the cable, the first constraining member being disposed on the first cylindrical member at a first location with the first portion of the cable contiguously engaging the first groove; and wherein the second restricting member comprises a second constraining member constraining the cable, the second constraining member being disposed on the second cylindrical member at a second location with the second portion of the cable contiguously engaging the second groove.

4. The vehicle steering device according to claim 3, wherein the first constraining member comprises a first ring member; and wherein the second constraining member comprises a second ring member.

5. The vehicle steering device according to claim 4, wherein the first constraining member comprises a first pin and a first connector coupling the first ring member with the first pin, and the first pin and the first connector are inserted into a first axial end surface of the first cylindrical member; and wherein the second constraining member comprises a second pin and a second connector coupling the second ring member with the second pin, and the second pin and the second connector are inserted into a second axial end surface of the second cylindrical member.

6. The vehicle steering device according to claim 2, wherein the turning unit is connected to the second cylindrical member through a clutch that mechanically engages the operating unit and the turning unit with respect to each other, and that mechanically disengages the operating unit and the turning unit with respect to each other.

7. A vehicle steering device that pivots at least one steering controlled vehicle wheel in response to a steering command, the vehicle steering device comprising:
  an operating unit receiving the steering command;
  a turning unit pivoting the at least one steering controlled vehicle wheel;
  one of the operating unit and the turning unit including a first cylindrical member that rotates about a first axis of rotation and that has a first groove formed on a first outer peripheral surface;
  the other the operating unit and the turning unit including a second cylindrical member that rotates about a second axis of rotation and that has a second groove formed on a second outer peripheral surface;
  a cable extending between first and second ends, the first end being coupled to the first cylindrical member and the second end being coupled to the second cylindrical member, the cable including:
    a first portion extending a first predetermined length from the first end, the first portion lying in the first groove and being wound on the first outer peripheral surface; and
    a second portion extending a second predetermined length from the second end, the second portion lying in the second groove and being wound on the second outer peripheral surface; and
  a first restricting member maintaining contiguous engagement between the first portion of the cable and the first groove, the first restricting member being spaced along the first portion from the first end;
  a second restricting member maintaining contiguous engagement between the second portion of the cable and the second groove, the second restricting member being spaced along the second portion from the second end;
  wherein the first restricting member is spaced from the first axis of rotation by a first radial distance such tat a bottom of the first groove is separated from the first restricting member by an amount corresponding to a diameter of the cable, and the first portion is sandwiched between the first restricting member and the bottom of the first groove; and wherein the second restricting member is spaced from the second axis of rotation by a second radial distance such that a bottom of the second groove is separated from the second restricting member by an amount corresponding to a diameter of the cable, and the second portion is sandwiched between the second restricting member and the bottom of the second groove.

8. The vehicle steering device according to claim 7, wherein the first groove extends helically about the first cylindrical member, the first groove comprises an intermediate groove segment that is disposed between a pair of distal groove segments, and the distal groove segments of the first groove are deeper than the intermediate groove segment of the first groove; and wherein the second groove extends helically about the second cylindrical member, the second groove comprises an intermediate groove segment that is disposed between a pair of distal groove segments, and the distal groove segments of the second groove are deeper than the intermediate groove segment of the second groove.

9. The vehicle steering device according to claim 8, wherein the first restricting member is inserted into a first axial end surface of the first cylindrical member and passes through one of the distal groove segments of the first groove; and wherein the second restricting member is inserted into a second axial end surface of the second cylindrical member and passes through one of the distal groove segments of the second groove.

10. The vehicle steering device according to claim 9, wherein the first and second restricting members each comprise a cylindrical pin.

11. A vehicle steering device that pivots at least one steering controlled vehicle wheel in response to a steering command, the vehicle steering device comprising:
an operating unit receiving the steering command;
a turning unit pivoting the at least one steering controlled vehicle wheel;
one of the operating unit and the turning unit including a first cylindrical member that rotates about a first axis of rotation and that has a first groove formed on a first outer peripheral surface;
the other the operating unit and the turning unit including a second cylindrical member that rotates about a second axis of rotation and that has a second groove formed on a second outer peripheral surface;
a cable extending between first and second ends, the first end being coupled to the first cylindrical member and the second end being coupled to the second cylindrical member, the cable including;
a first portion extending a first predetermined length from the first end, the first portion lying in the first groove and being wound on the first outer peripheral surface; and
a second portion extending a second predetermined length from the second end, the second portion lying in the second groove and being wound on the second outer peripheral surface; and
a first restricting member maintaining contiguous engagement between the first portion of the cable and the first groove, the first restricting member being spaced along the first portion from the first end;
a second restricting member maintaining contiguous engagement between the second portion of the cable and the second groove, the second restricting member being spaced along the second portion from the second end;
wherein the first restricting member is disposed at a location on the first cylindrical member such that there is a first friction force due to the contiguous engagement between the first portion and the first groove, and the first friction force opposes a first tensile force due to the cable being wound on the second cylindrical member; and
wherein the second restricting member is disposed at a location on the second cylindrical member such that there is a second friction force due to the contiguous engagement between the second portion and the second groove, and the second friction force opposes a second tensile force due to the cable being wound on the first cylindrical member.

12. A vehicle steering device that pivots at least one steering controlled vehicle wheel in response to a steering command, the vehicle steering device comprising:
a cylindrical member rotating about an axis of rotation in response to at least one of the steering command and pivoting of the at least one steering controlled vehicle wheel, the cylindrical member including a groove formed on an outer peripheral surface;
a cable including:
an end being coupled to the cylindrical member; and
a portion extending a predetermined length from the end, the portion lying in the groove and being wound on the outer peripheral surface of the cylindrical member; and
a restricting member rotating with the cylindrical member and maintaining contiguous engagement between the portion of the cable and the groove, the restricting member being spaced along the portion from the end.

13. A vehicle steering device that pivots at least one steering controlled vehicle wheel in response to a steering command, the vehicle steering device comprising:
operating means for receiving the steering command;
turning means for pivoting the at last one steering controlled vehicle wheel;
cable means for transmitting torque between the operating means and the turning means; and
winding means for converting linear movement of the cable means to rotary movement of the operating and turning means including the winding means including restricting means rotating with the winding means for preventing rising of the cable means with respect to the winding means during not more than one rotation of the winding means.

14. The vehicle steering device according to claim 13, wherein the restricting means prevents rising during approximately one-half rotation of the winding means.

15. A vehicle steering device that pivots at least one steering controlled vehicle wheel in response to a steering command, the vehicle steering device comprising:
operating means for receiving the steering command;
turning means for pivoting the at last one steering controlled vehicle wheel;
cable means for transmitting torque between the operating means and the turning means;
winding means for converting linear movement of the cable means to rotary movement of the operating and turning means; and
restricting means for preventing rising of the cable means with respect to the winding means during not more than one rotation of the winding means;
wherein the restricting means comprises opposing a tensile force in the cable means with a friction force between the cable and winding means.

16. A steering method of pivoting at least one steering controlled vehicle wheel in response to a steering command, the method comprising:
winding a first end of a cable on a first cylindrical member;
winding a second end of the cable on a second cylindrical member;
securing the first end to the first cylindrical member;
securing the second end to the second cylindrical member; and
restraining with respect to less than one rotation of the first cylindrical member a first portion of the cable to cause contiguous engagement between the first portion and the first cylindrical member, the first portion of the cable extending from the first end toward the second end, such that there is a friction force due to the contiguous engagement between the first portion and the first cylindrical member, the friction force opposing a tensile force due to the cable being wound on the second cylindrical member.

17. The method according to claim 16, further comprising:
rotationally coupling one of the first cylindrical member and the second cylindrical member to an operating unit receiving the steering command; and
rotationally coupling, the other the first cylindrical member and the second cylindrical member to a turning unit pivoting the at least one steering controlled vehicle wheel.

18. The method according to claim 17, further comprising:
disengaging at least one of the rotational coupling of the first cylindrical member to the operating unit, and the rotational coupling of the second cylindrical member to the turning unit.

19. A system of transferring torque, comprising:
a first cylindrical member rotating about a first axis of rotation and having a first groove formed on a first outer peripheral surface;
a second cylindrical member rotating about a second axis of rotation and having a second groove formed on a second outer peripheral surface;
a first cable extending between first and second ends, the first end being coupled to the first cylindrical member and the second end being coupled to the second cylindrical member, the first cable including:
   a first portion extending a first predetermined length from the first end, the first portion lying in the first groove and being wound on the first outer peripheral surface; and
   a second portion extending a second predetermined length from the second end, the second portion lying in the second groove and being wound on the second outer peripheral surface; and
a first restricting member rotating with the first cylindrical member and maintaining contiguous engagement between the first portion of the first cable and the first groove, the first restricting member being spaced along the first portion from the first end.

20. The system of transferring torque according to claim 19, further comprising:
a second restricting member rotating with the second cylindrical member and maintaining contiguous engagement between the second portion of the first cable and the second groove, the second restricting member being spaced along the second portion from the second end.

* * * * *